United States Patent [19]
Rogers

[11] 3,990,987
[45] Nov. 9, 1976

[54] SMOKE GENERATOR

[75] Inventor: James R. Rogers, San Jose, Calif.

[73] Assignee: The United States of America as represented by the Administrator of the National Aeronautics and Space Administration, Washington, D.C.

[22] Filed: Oct. 1, 1975

[21] Appl. No.: 618,594

[52] U.S. Cl. .............................. 252/359 A; 219/300; 219/304; 239/171
[51] Int. Cl.² ..................... B01J 13/00; F24H 1/14; H05B 1/00
[58] Field of Search ................. 252/359 A; 239/136, 239/171; 43/125, 127; 47/2; 219/300, 303–305; 159/DIG. 1

[56] References Cited
UNITED STATES PATENTS

| | | | |
|---|---|---|---|
| 1,631,753 | 6/1927 | Midulla | 219/303 |
| 2,097,581 | 11/1937 | Beyrodt | 219/304 X |
| 2,688,069 | 8/1954 | Combest | 219/303 |
| 2,801,322 | 7/1957 | Weatherill | 219/304 X |
| 3,126,155 | 3/1964 | Lohse | 252/359 A X |
| 3,234,357 | 2/1966 | Seuthe | 219/300 X |
| 3,338,476 | 8/1967 | Marcoux | 219/300 |
| 3,835,293 | 9/1974 | McAlister | 219/300 |

Primary Examiner—Jack Sofer
Attorney, Agent, or Firm—Darrell G. Brekke; Gary F. Grafel; John R. Manning

[57] ABSTRACT

A smoke generator is disclosed which is particularly suitable for mounting on the wing tips of an aircraft and for conducting airflow studies. The device includes a network of thermally insulated tubes for carrying a fluid which is used to produce smoke. The fluid, which need not be combustible, is heated above its vaporization temperature by electric current which is passed through the fluid conduit tubes, so that the tubes serve both as fluid conduits and resistance heating elements. Fluid supply and monitoring systems and electrical control systems are also disclosed.

6 Claims, 9 Drawing Figures

SMOKE GENERATOR

ORIGIN OF THE INVENTION

The invention described herein was made by an employee of the United States Government and may be manufactured and used by or for the Government for Governmental purposes without the payment of any royalties thereon or therefor.

BACKGROUND OF THE INVENTION

1. Field of the Invention

The present invention relates generally to smoke generators and more particularly to eletrically-heated smoke generators particularly suited for air flow studies.

2. Description of the Prior Art

It is desirable in many circumstances to generate smoke for use in air flow studies, sky writing, and similar circumstances. A particular area of research in which smoke generators are important is in the study of vortices created by the wakes of modern aircraft, particularly the very large multiple engine craft now in use for transporting cargo and personnel.

In making such studies, it is desirable that devices be made available for generating smoke on a continuous basis and that such devices are preferably relatively small and reliable in structure to permit mounting at the wing tips of aircraft or within wind tunnels and similar environments.

In the past, smoke bombs have been used for air flow studies, but have proven to be unsatisfactory in view of their capability of producing smoke for only a relatively short interval. Relatively large and complex smoke generators have also been designed which provided an adequate smoke supply of long-term duration, but which required the burning of a fuel, such as gasoline, for the production of smoke. A specific example of a device of this type is disclosed in U.S. Pat. No. 3,242,098 to Andrews. The Andrews device is large and complex, creating additional hazards when used in the environment mentioned above.

Other types of portable smoke or fog generating devices are known, such as those described in U.S. Pat. No. 3,496,668 to Slater et al. and in U.S. Pat. No. 3,675,360 to Pierce. However, devices of the type described in these patents are not suitable for use with aircraft or in wind tunnels, and generally produce a large particle, toxic mist not suitable for use in air flow studies.

A variety of smoke generators are also known which produce smoke particles of a desirable type through electric heating of appropriate smoke generating materials. Examples of such devices are disclosed in U.S. Pat. Nos. 2,324,359 to Callan, 3,160,980 to Seuthe and 3,432,439 to Dickman. However, all of these devices are complicated, expensive to produce and lack the high level of reliability and efficiency desirable in smoke generators to be used on aircraft or in wind tunnels.

A need therefore exists for an improved smoke generator particularly suitable for use in air flow studies

SUMMARY OF THE INVENTION

Accordingly, one object of the present invention is to provide a novel smoke generator particularly suitable for use in air flow studies.

Another object of the present invention is the provision of a novel smoke generator of small size and reliable structure particularly adapted for use in connection with air flow studies.

Yet another object of the present invention is the provision of a novel electrically-heated smoke generator of improved and simplified construction.

Yet another object of the present invention is the provision of a novel smoke generator which includes a fluid delivery tubing network that also serves as an electric heating element for producing smoke.

Yet another object of the present invention is the provision of a novel smoke generator which does not require the use of combustible fuels and which may produce smoke from both combustible and non-combustible fluids.

Briefly, these and other objects of the present invention are achieved by the provision of a smoke generator including a central core of a generally cylindrical shape along the length of which are positioned a plurality of smoke generating longitudinal coils of hyperdermic tubing insulated by ceramic sleeves. An electric power supply is coupled to the smoke generating coils for heating the fluid within them to produce smoke. A main fluid delivery tube is coiled around the central heating assembly to permit preheating of the smoke generating fluid before it is fed to the smoke generating tubes. The entire assembly is enclosed in a cylindrical steel casing closed at both ends by aero-dynamically formed cones.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
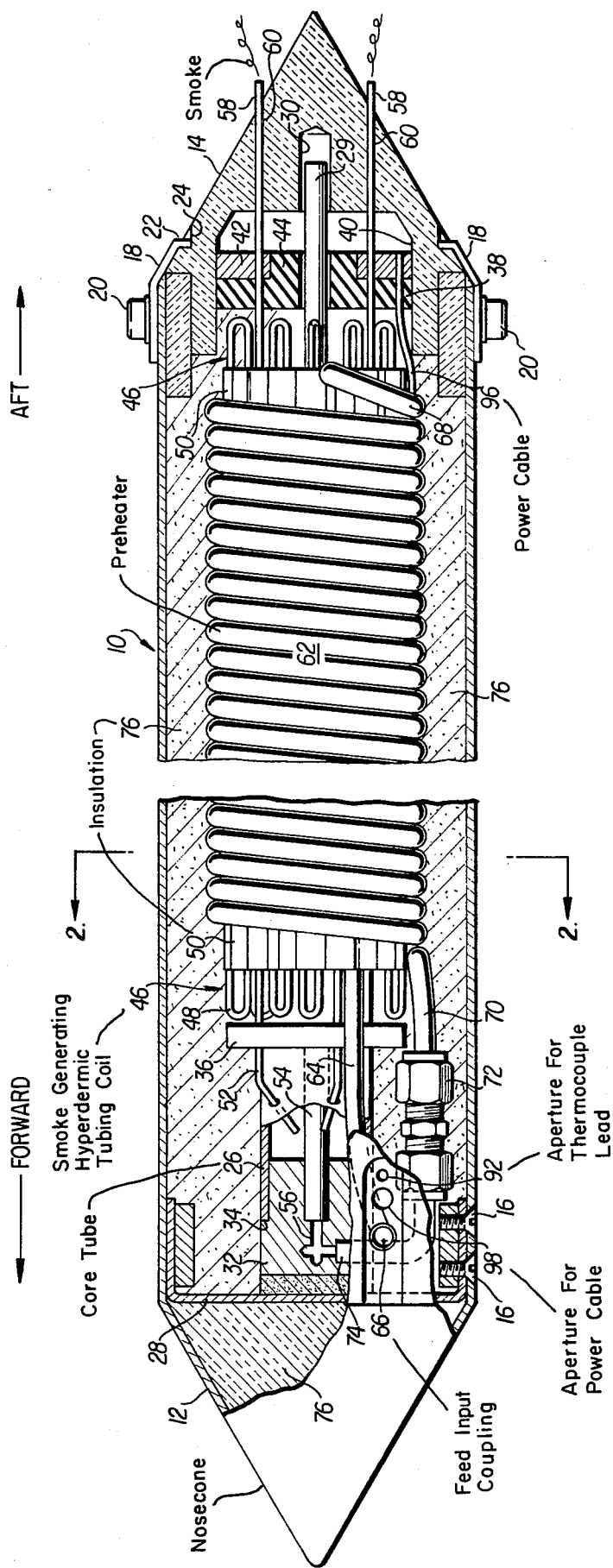
FIG. 1 is a partially cut away side view of the smoke generator of the present invention.

Referring now to the drawings, wherein like reference numerals designate identical or corresponding parts throughout the several views, and more particularly to FIG. 1 thereof, the general configuration of the smoke generator apparatus of the present invention is illustrated in detail. More particularly, the apparatus includes a tubular housing 10, which may be formed of three inch (or larger) outer diameter stainless steel tubing of one-sixteenth inch (or less) thickness, closed at the forward end by a nose cone 12 formed of similar material and closed at the aft end thereof by a ceramic cone 14. The nose cone 12 is preferably removably secured to the main tubular housing 10 by a plurality of conventional screws 16. The ceramic cone 14 is also removably secured to the main housing 10 by means of a plurality of steel clips 18 which are fastened by bolts 20 to the housing 10 and which include tapered fingers 22 which interfit with notches 24 formed around the periphery of the cone 14 near its base.

A core tube 26, preferably formed of brass, is positioned along the central axis of the tubular housing 10 and is secured to a forward wall 28 at the front portion of the housing 10 and is supported in the ceramic cone 14 by a rod 29 inserted into an appropriately dimensioned apperture 30 within the ceramic cone 14. A brass fitting 32 having a reduced shoulder 34 for interfitting with the core tube 26 is used to couple the core tube to the forward wall 28 of the housing 10.

A first ceramic electrical insulator spacer 36 is positioned around the core tube 26 near the forward end thereof, and a second electrical insulator ceramic spacer 38 is positioned around the rod 29 at a position within an opening 40 in the base portion of the cone 14. A tube calendar support and copper electrical bus 42 is positioned around a cylindrical extension 44 of the ceramic spacer 38. Between the spacers 36 and 38 are positioned five smoke generating hyperdermic tubing coils 46. The smoke generating coils, which are illustrated in more detail in FIGS. 4 and 5, each include one continuous length of stainless steel hyperdermic tubing 48 with each inner leg extending parallel to the axis of the core tube 26 FIG. 2 between the ceramic spacers 36 and 38. The main portion of tubing 48 is surrounded by a ceramic electrical insulator or sleeve 50 so that only the loop end portions of each length of tubing 48 protrude beyond the ceramic insulators 50.

The forward end of each smoke generating coil 46 includes an extension 52 which is passed through one of five suitable appartures in the core tube 26 to permit each of the extensions 52, which have open ends, to receive fluid supplied through a feed tube 54 which is mounted along the axis of core tube 26. The feed tube 54, which is open at its aft end, is welded or silver soldered to the brass fitting 32 at its forward end and cooperates with a feed channel 56 machined through the fitting 32 to supply the smoke generating fluid to the interior of the core tube 26. The feed tube 54 and coil extensions 52 together with the core tube 26 and fitting 32 form an intake manifold for the smoke generating coils. Each of the smoke generating coils 46 includes an exhaust extension 58 protruding through appropriately dimensioned apperture 60 in the ceramic cone 14 for dispensing the generated smoke at the rear of the smoke generator apparatus. The exhaust extensions are in electrical contact with the tube calendar support and electrical bus 42 to permit electrical power to be applied to each of the coils 46.

A pre-heating coil 62 is formed of a single tube formed into a helical coil and positioned around the ceramic insulator tubes 50. The pre-heating coil, is preferably formed by winding a length of suitable copper tubing, such as three-sixteenths inch outer diameter copper tubing, around a mandrel and then positioning the resulting coil over the ceramic insulator tubes 50 assembled around the core tube 26. The pre-heating coil includes an input extension which is connected to an input coupling 66 at the surface of the tubular housing 10 and which is shaped to pass through the interior of the pre-heating coil 62 emerging at its aft end as a partially-coiled tubing element 68. The pre-heating coil also includes an output extension 70 which is connected through conventional tube coupling hardware 72 to a feeder elbow 74 which is silver-soldered to the brass fitting 32 in communication with the feed channel 56 so that a continuous fluid input path is provided from the input coupling 66 through the pre-heating coil 62 to the feed tube 54 and subsequently to the individual smoke generating coils 46.

The spaces between the interior tube structures and the tubular housing 10 are filled with a suitable high temperature insulation 76, such as "Cera Felt" (TM) manufactured by the Johns Manville Corporation. A similar type of high temperature insulation is preferably used to fill the interior of nose cone 12.

Figure 2:
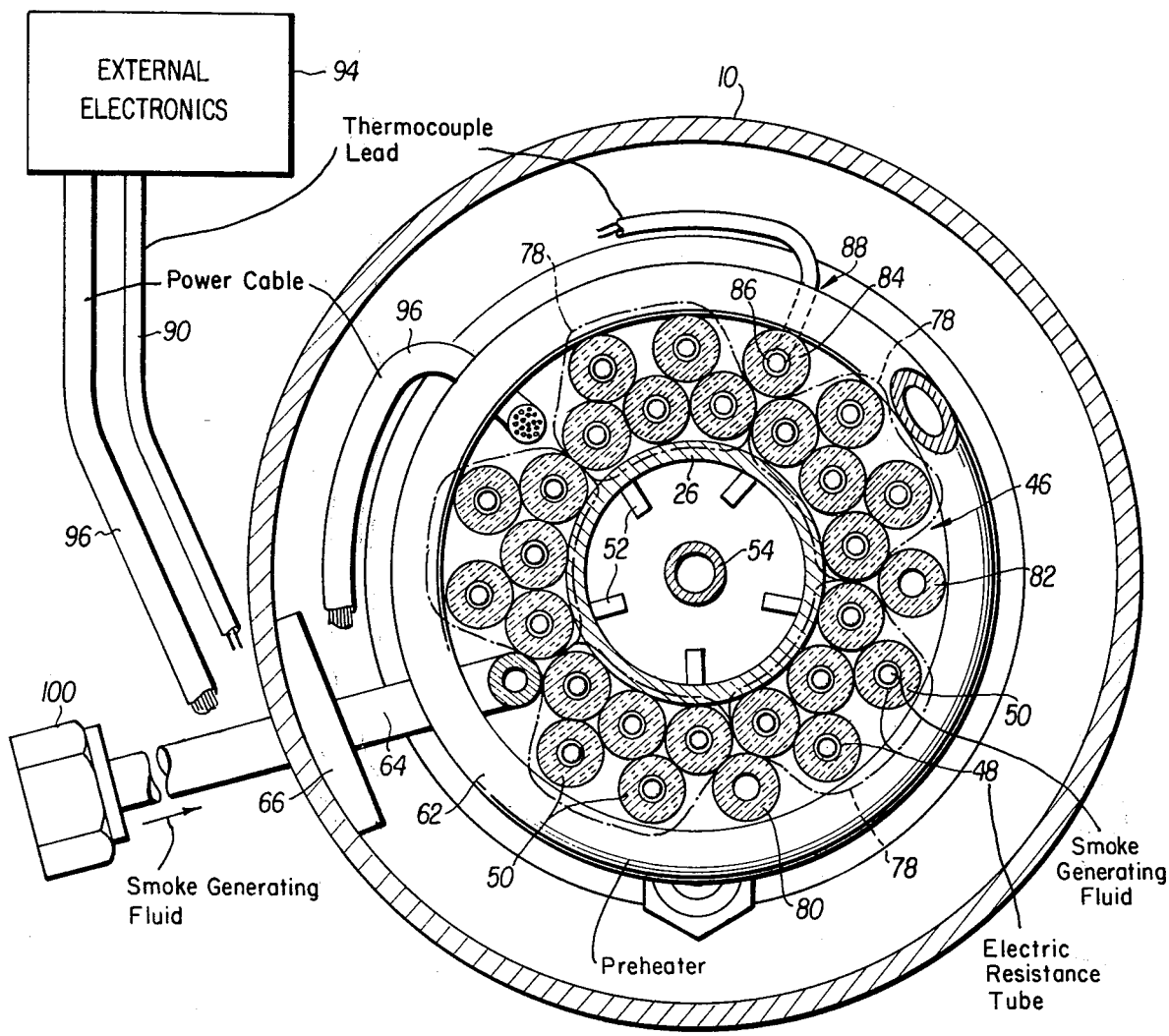
FIG. 2 is a sectional view of the apparatus of FIG. 1 taken along the lines 2—2.
Figure 4:
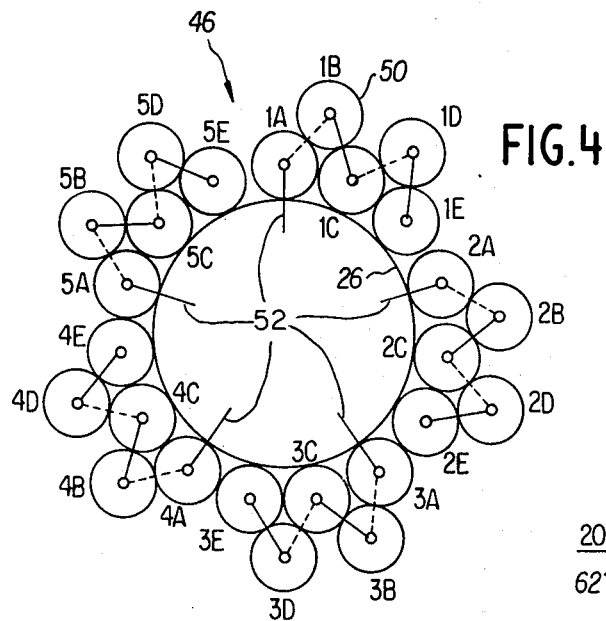
FIG. 4 is a schematic illustration of the smoke generator tube arrangement of the present invention.
Figure 5:
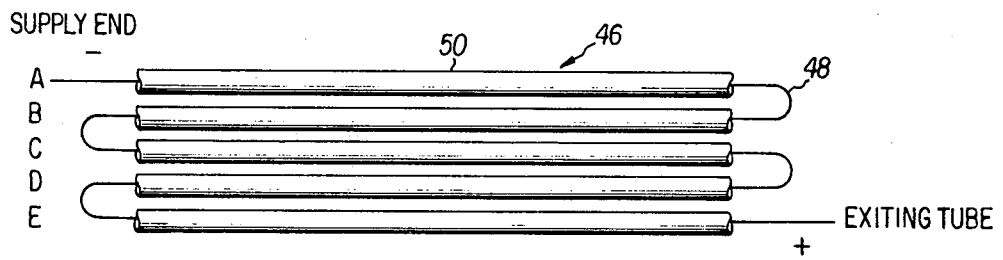
FIG. 5 is a schematic illustration of the coiled arrangement of the fluid delivery hyperdermic tubes.

Referring now to FIG. 2, the cross-sectional configuration of the smoke generator is illustrated and the arrangement of the hyperdermic tubes forming each of the smoke generator coils 46 is illustrated more clearly. More particularly, each of the dashed lines 78 surrounds one continuous coiled length of hyperdermic tubing and their insulating elements or sleeves to form one smoke generating coil. The arrangement of the tubes is also illustrated clearly in schematic form in FIG. 4 wherein each of the five smoke generating coils are designated by the reference numerals 1 through 5 and each of the five lengths of tubing forming each coil are designated by the letters A through E. Similarly, FIG. 5 illustrates the manner in which the continuous tube lengths A through E of each smoke generating coil are threaded through the ceramic insulators 50. As shown in FIGS. 2 and 4, each smoke generating coil is formed in two layers, the first layer including three runs of tubing adjacent to the core tube 26 and the second layer including two more runs of tubing on top of the first layer.

Referring again to FIG. 2, the manner in which various auxiliary or spacing elements interfit with the smoke generating coils 46 is shown. For example, a pair of auxiliary ceramic tubes or sleeves 80 and 82 are positioned in openings created by the particular five-tube arrangement of each of the smoke generating coils. The ceramic tubes 80 and 82 may be identical to the ceramic electrical insulators 50 surrounding the smoke generating tubing 48. An additional ceramic tube or sleeve 84 is provided, also in a space between the smoke generating coils, for housing a thermocouple wire 86 coupled to a conventional thermocouple 88. The thermocouple includes an output lead 90 which is passed through an apperture 92 adjacent to the input coupling 66 to an external electronics package 94 which will be described in more detail subsequently. Similarly, a power cable 96 is passed through an apperture 98 (shown in FIG. 1) to the external electronics package 94, and is positioned within the body of the smoke generator in one of the spaces between the smoke generating coils in a manner similar to the auxiliary ceramic tubes 82 through 84. The power cable is directly connected to the tube calendar support and electric bus 42 which in turn is in electrical contact with the exhaust extension 58 of each smoke generator coil, as mentioned previously, for supplying electrical power to each coil. It is noted that the opposite end of each coil is coupled to ground potential at the extension 52 for completing the electric heating circuit.

The input extension 64 of the pre-heating coil 62 is formed to pass through the coil 62, as mentioned above, and the portion passing through the coil 62 is similarly positioned between the pre-heating coils. In FIG. 2 the input extension 64 is shown protruding through the input coupling 66 to an external tube fitting 100 which may be coupled to a conventional tank or reservoir of smoke generating fluid.

Figure 7:
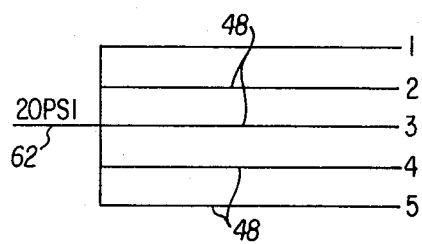
FIG. 7 is a schematic illustration of the parallel plumbing equivalent of the fluid delivery tube arrangement of the invention.
Figure 6:
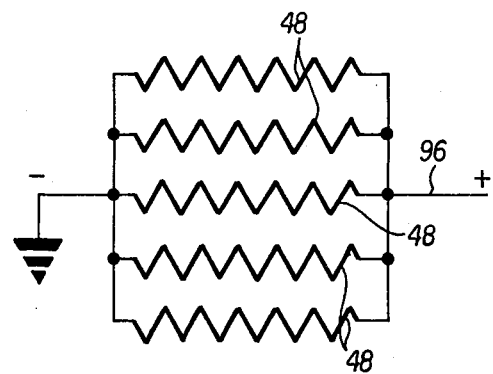
FIG. 6 is a schematic illustration of an equivalent eletrical circuit illustrating the manner in which the hyperdermic tubes are coupled to an electrical supply system.

FIGS. 6 and 7 illustrate the electrical and plumbing equivalent circuits of the smoke generating system. As shown in FIG. 6, a suitable electrical potential, such as 28 volts DC, is coupled through the eletrical lead 96 across the entire length of the smoke generating tubing of each of the individual generating coils. The tubing thus in itself acts as a resistance heater for heating the smoke generating liquid passing through each coil. FIG. 7 illustrates the parallel plumbing equivalent showing the pre-heating coil 62 supplying smoke generating liquid at a suitable input pressure such as 20 psi to the tubing forming each smoke generating coil. This pressure is sufficient to supply an adequate quantity of smoke generating liquid to each coil to produce the desired volume of output smoke.

Figure 3:
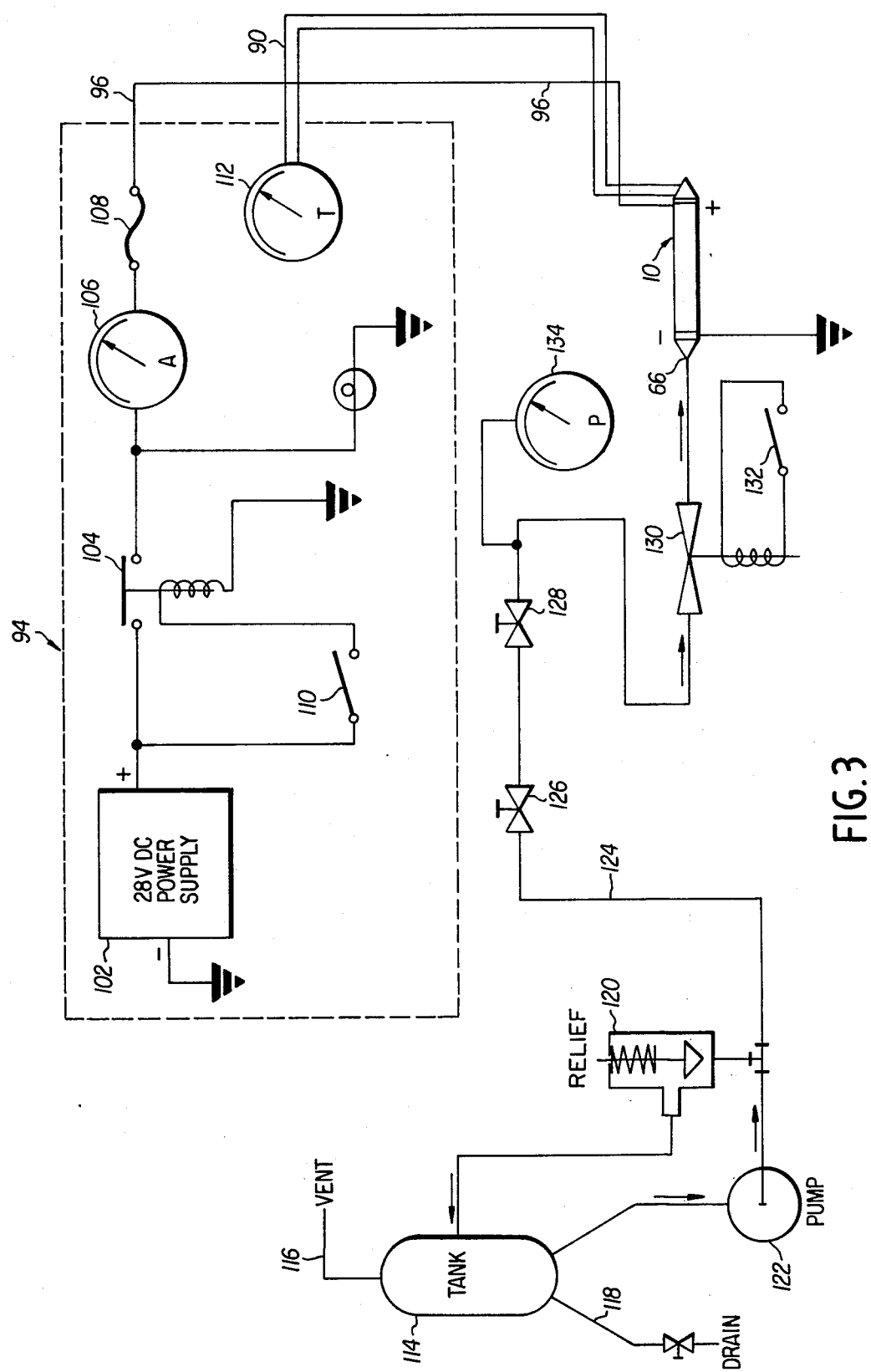
FIG. 3 is a schematic diagram of the fluid supply and eletrical control network for the smoke generator of the present invention.

Attention is now directed to FIG. 3 wherein the electrical control circuit and smoke generating fluid supply system are illustrated schematically. The electrical system includes a DC power supply 102, preferably a 28-volt system of the type conventionally used on aircraft, although other conventional power supplies and other voltage levels can also be used. The power supply 102 is coupled through a power relay 104, a conventional ammeter 106 and a circuit breaker 108 to the power cable 96 which, as previously explained, is coupled to the electrical bus 42 for providing electrical power. A control switch 110 is provided for actuating the coil of relay 104 for controlling the heating current. A temperature indicator or thermostatic controller 112 is coupled to the thermocouple output lead 90 for providing an indication and/or control of the temperature of the smoke generating coils.

The smoke generating fluid delivery system includes a conventional tank 114 having vent and drain fittings 116 and 118, respectively. The tank and system is protected by a bypass relief valve 120 which may, for example, be set at a pressure of 60 psi. Fluid is removed from the tank and delivered to the smoke generator by a conventional pump 122 which delivers the fluid over a suitable line 124 through an oil shutoff valve 126, a needle flow control valve 128 and a solenoid valve 130 to the input coupling 100 of the smoke generator. The solenoid valve 130 is controlled by a suitable control switch 132 permitting smoke generating fluid to flow into the smoke generating coils. A conventional pressure gauge 134 is coupled to the line 124 for monitoring the pressure of the fluid in the line.

It is noted that the smoke generating liquid is preferably corvus oil, although other types of fluids, both combustible and non-combustible, may be used to generate smoke in the apparatus of the present invention. The selection of the smoke generating fluid is determined primarily by the properties of the smoke which the system is desired to generate.

In operation, electrical power is first supplied to the power cable 96 to initiate heating of the smoke generating tubing 48. The pump 122 is subsequently activated to deliver fluid to the smoke generating coils. In each coil the fluid is heated until it becomes a superheated vapor, which escapes from the exhaust extensions 58 in the form of smoke. The smoke generating tubing is electrically and thermally insulated from other components within the smoke generator by the ceramic insulators 50, by the ceramic tail cone 14 and by the ceramic spacers 36 and 38. The heat generated by the electrical heating of the smoke generating tubes is used to preheat the incoming fluid before it enters the smoke generating coils by use of the preheating coil 62 before the oil enters the manifold or chamber in the forward end of the core tube 26.

All parts of the apparatus are made and assembled to allow for the expansion produced by the heating of the unit. In constructing, the unit tubing is cut in equal lengths and by its symmetry expands equally. The tail cone is shaped to appropriately form the smoke pattern produced by the device. The thermocouple 112 or a thermostat may be coupled to the power relay 104 to switch the heating current on and off in order to maintain the smoke generating coils within an appropriate temperature range. For example, the electrical power is preferably left on until the heating coils reach approximately 750°F (when using corvus oil as a smoke generating liquid). The smoke generating fluid supply is then activated and smoke is generated. When the smoke generator is to be turned off, it is preferred that the electric power is first switched off to permit the unit to cool, and the oil supply is turned off subsequently in order to purge the smoke generating tubes and flush away any burned residue.

The total resistance of the smoke generating coils is a function of the tubing material including the length and size of the tubing. The higher resistance of the tubing material, the shorter the length of the tubing required. Conversely, more tubes can be added or larger sized tubing can be used. The generated smoke volume increases as larger tubing is used, as will be apparent to those skilled in the art.

Figure 8:
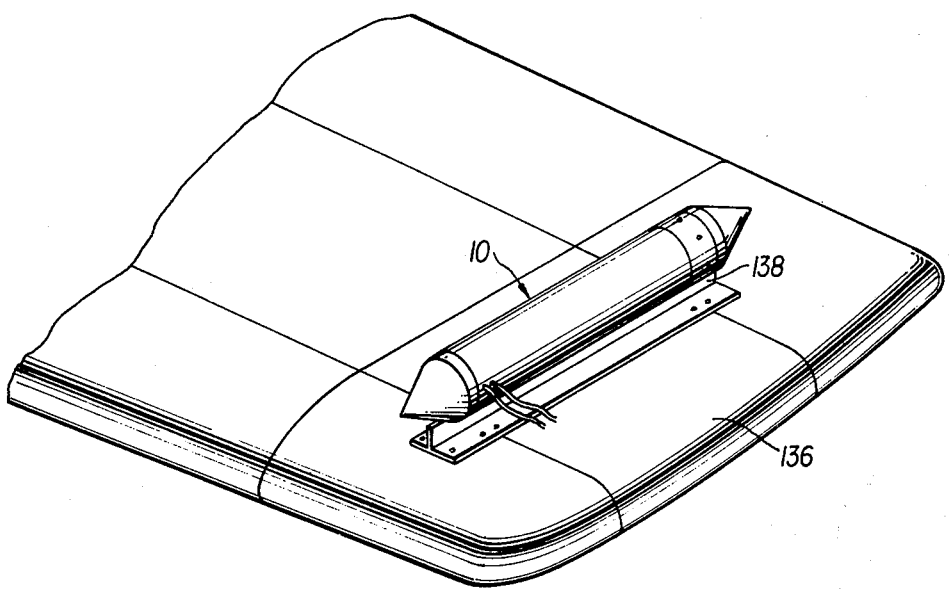
FIG. 8 is a perspective illustration of the assembled apparatus mounted on the wing tip of an aircraft.
Figure 9:
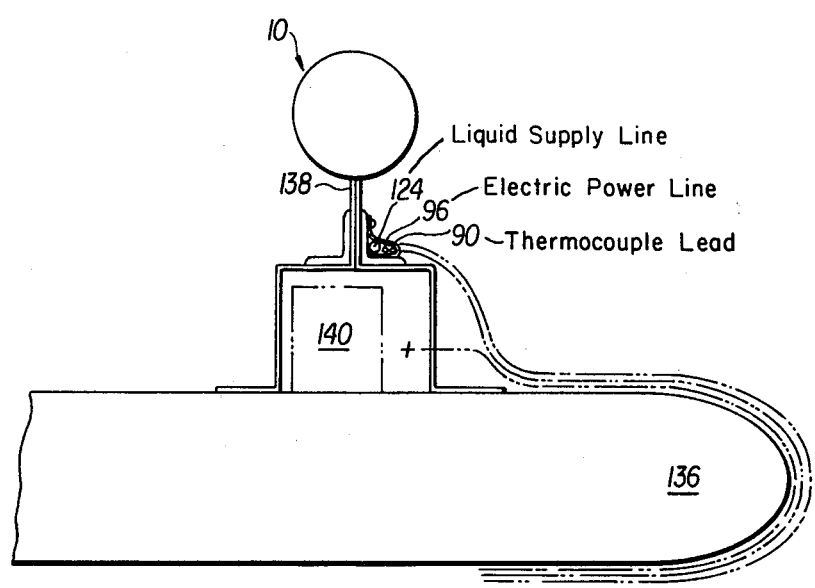
FIG. 9 is an end view of the mounted apparatus of FIG. 8 showing further details of the mounting, electrical supply and fluid delivery couplings.

Attention is now directed to FIGS. 8 and 9 wherein the technique of mounting the smoke generator of the present invention to the wing of an aircraft is illustrated. Referring particularly to FIG. 8, an aircraft wing tip 136 illustrated showing the smoke generator 10 mounted by means of a suitable bracket 138 to the wing tip. FIG. 9 illustrates in more detail the mounting apparatus. The liquid supply line 124 and electrical power and thermocouple leads 96 and 90 are shown more clearly in FIG. 9 as bundled together and wrapped around the wing tip, leading back to the main fuselage of the aircraft wherein the liquid supply and electrical equipment is located. A raised structure 140, which may include the solenoid valve 130 is also shown in the illustration of FIG. 9 representing the fact that the solenoid valve may be mounted in close proximity to the smoke generator 10.

The apparatus of the present invention may be altered in that its general shape can be modified to suit particular environments. For example, a flattened or oval shape is also possible in addition to the generally cylindrical shape illustrated in the drawings. It can also be designed to operate at different electrical voltages and to operate using both alternating and direct current. The unit of the present invention is extraordinarily safe in operation and is easily controllable for generating smoke without the need for complicated interfacing equipment. Once the vaporizing temperature of the liquid used for generating smoke is determined, the unit can easily be adjusted to work at that temperature. Although many different types of smoke generating liquids may be used, Corvus (TM) oil manufactured by Texaco is recommended.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A smoke generator comprising:
   an elongated central core structure,
   a plurality of smoke generating hyperdermic tubing coils arranged about said central core structure, each of said smoke generating coils providing both conduction of electrical current and transmission of smoke generating fluid,
   electrical heating means coupled to said tubing in each said smoke generating coil for heating said tubing and thereby vaporizing said fluid; and,
   a preheating means coupled to said smoke generating coils for supplying smoke generating fluid to said smoke generating coils and for permitting said fluid to be heated prior to its entry into said smoke generating coils.

2. A smoke generator as in claim 1, further comprising:
   a plurality of ceramic insulators surrounding said lengths of tubing included in each said smoke generating coil for electrically insulating said lengths of tubing; and wherein,
   each of said lengths of tubing is formed into a longitudinal coil oriented parallel to the longitudinal axis of said central core structure.

3. A smoke generator as in claim 2, further comprising:
   ceramic insulators positioned around said central core structure between opposite ends of said smoke generating coils and partially encasing same,
   an external housing enclosing said smoke generator,
   a nose cone secured to a forward end of said housing; and,
   a ceramic tail cone secured to an aft end of said housing.

4. A smoke generator as in claim 1, wherein said elongated central core structure comprises:
   a core tube,
   an axial supply tube for smoke generating fluid
   a fluid supply manifold centrally positioned within said core tube and including a portion of said supply tube: and,
   a fitting having a fluid supply channel therein enclosing one end of said core tube, said fluid supply manifold coupled to said fitting and cooperating with said fluid supply channel.

5. A smoke generator as in claim 4, wherein said preheating means further comprises:
   a coil of tubing having a first end coupled to said fitting and cooperating with said fluid supply channel and a second end adapted to be coupled to a supply of smoke generating fluid.

6. A smoke generator as in claim 1, wherein said electrical heating means further comprises:
   an electrical power supply,
   a control switch coupled to said power supply; and,
   temperature sensitive means coupled to said control switch for controlling said switch in response to the temperature of said smoke generating coils.

* * * * *